United States Patent Office 3,406,665
Patented Oct. 22, 1968

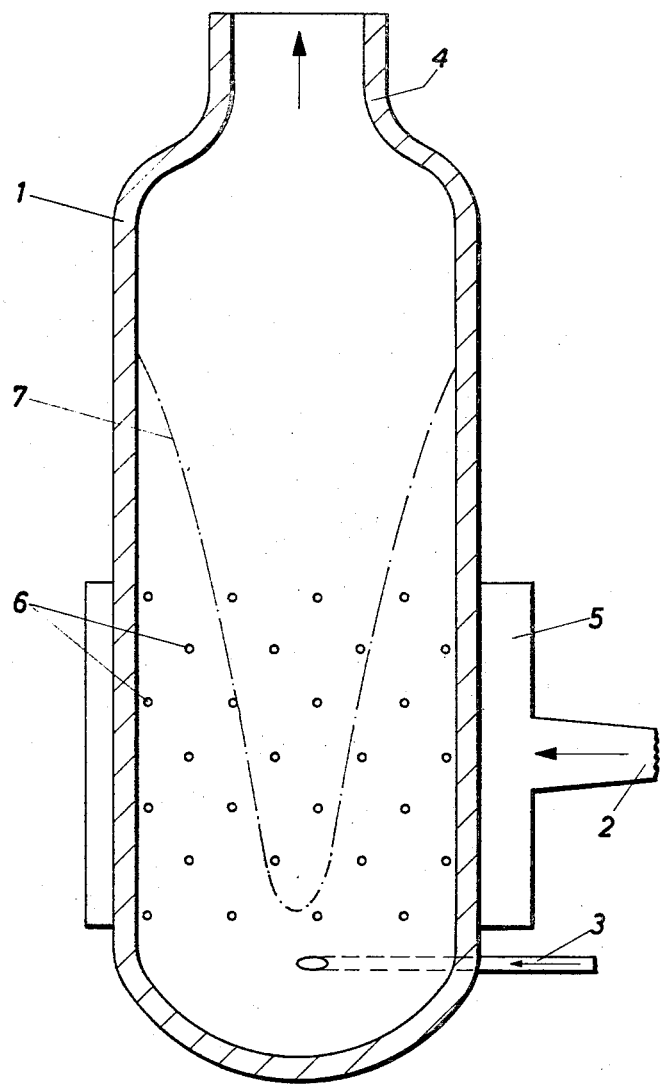

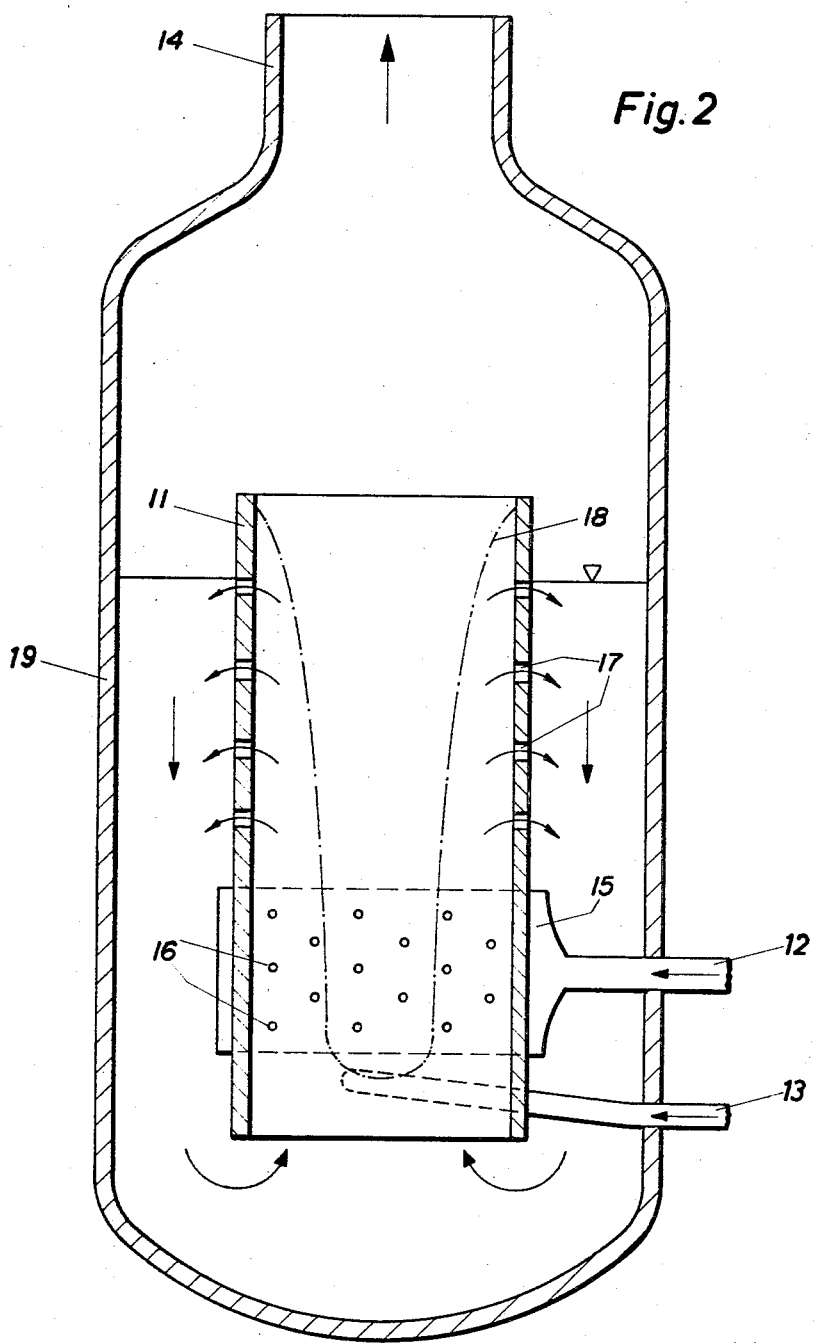

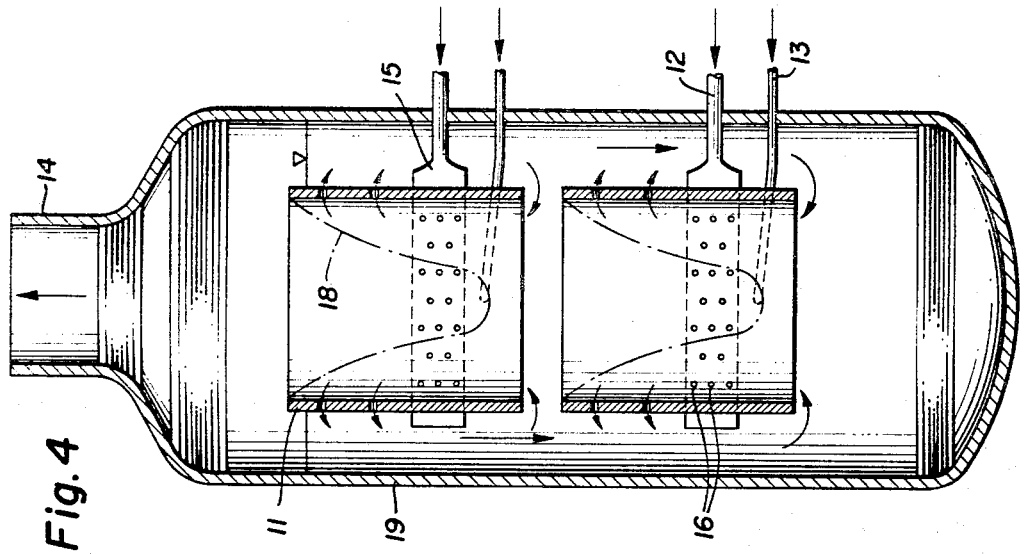
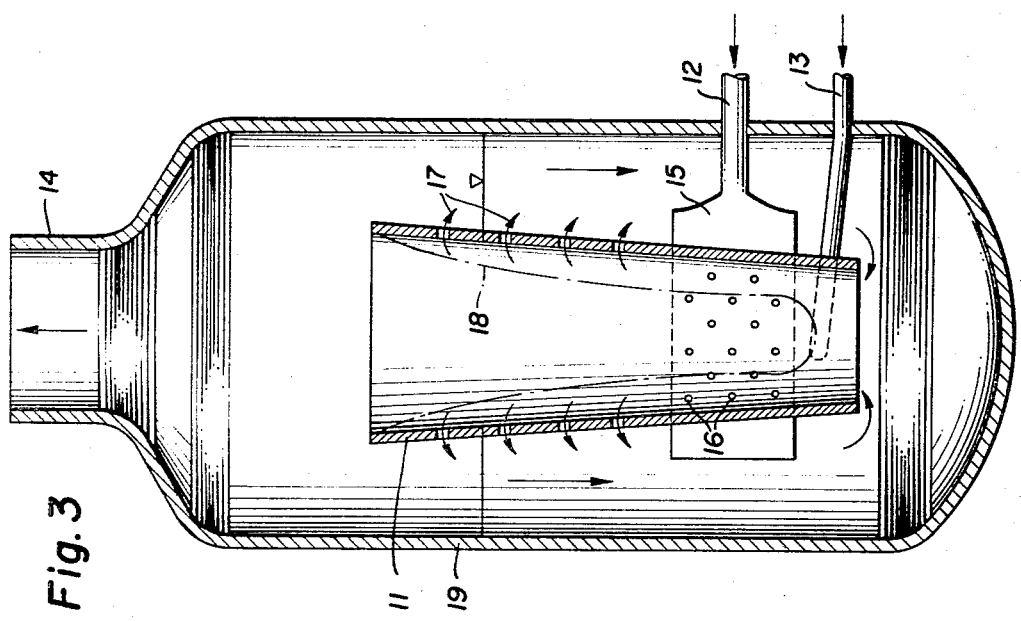

3,406,665
STEAM GENERATOR
Fritz Bukau, Karlsruhe, Germany, assignor to Gesellschaft fur Kernforschung m.b.H., Karlsruhe, Germany, a German corporation
Filed Nov. 26, 1965, Ser. No. 510,458
Claims priority, application Germany, Nov. 26, 1964, G 42,110
5 Claims. (Cl. 122—31)

ABSTRACT OF THE DISCLOSURE

A steam generator is disclosed comprising a vertically arranged condensate reception vessel at least partially filled with liquid to be evaporated having coaxially positioned therein an open ended mixing vessel, the upper end of which extends above the liquid level in the outer vessel. Steam is introduced into a housing surrounding the lowermost portion of the mixing vessel and from there is fed into uniformly distributed steam inlet openings which open into the mixing vessel tangentially. The liquid contained therein is thus forced into a rotary motion. The generated saturated steam collects in the center of the vortex and is discharged from the mixing vessel and surrounding vessel in an axial direction. The liquid separated from the rotating steam-liquid mixture flows outwardly and is discharged through openings in the mixing vessel into the outer reception vessel.

The invention relates to a steam generator in which condensate is evaporated with preferably superheated steam by being injected into an essentially axially symmetrical condensate-hot steam mixing vessel.

The method of producing saturated steam by mixing of the hot steam and condensate has been known for a long time. In most cases this is done either by injecting the condensate into the hot steam or by introducing the hot steam into the condensate through nozzles. In both cases it is possible that the saturated steam generated carries along condensate particles. This is mostly without any special significance. Especially for the cooling of steam cooled nuclear reactors, however, dry saturated steam should be used in general because the water particles carried into the core along with the saturated steam can easily produce corrosion phenomena of and salt deposits at the fuel element cans. Moreover, it is an advantage to have cooling steam of a uniform density in the core. Therefore it has been suggested already to dry the steam by centrifuging or slight superheating after it leaves the steam generator. However, this requires additional equipment which has to be set up at the outlet side of the steam generator. According to another proposal it is possible to generate also dry saturated steam in steam generators, if the inlet tubes for the hot steam are arranged in the saturated steam outlet line, but under some conditions this will make the steam more superheated than is required for it to dry. Moreover, practically all known steam generators require a relatively large volume for intensive mixing of the condensate with the hot steam and for separating the liquid particles carried along by the saturated steam produced.

In the steam generator according to this invention also superheated steam is preferably used for injection into an essentially axially symmetrical condensate-hot steam mixing vessel. However, this invention is intended to create a steam generator which produces dry steam at a minimum of expense and very small dimensions. To reach this aim the steam generator according to the invention contains guiding devices for the hot steam which is to be introduced into the mixing vessel and/or the condensate which force the steam-condensate mixture in the mixing vessel into a rotation. The simplest guiding devices are thought to be hot steam and condensate inlet lines tangentially opening into the axially symmetrical mixing vessel. The tangential inflow of hot steam and the likewise tangential inflow of condensate create a vortex in the mixing vessel the speed of revolution of which is known to increase very markedly in the direction of the center of the vortex. The steam bubbles entering the mixing vessel from the outside undergo a strong "lift" directed towards the center of the vortex which is proportional to the difference in specific gravity between steam and condensate and the square of the circumferential speed. On its spiralling way to the center of the vortex the steam bubble also constantly enters vortex layers of a faster flow which distort and disrupt it, thus bringing about a close large area contact between liquid and steam which results in a rapid heat exchange. The saturated steam collects in the center of the vortex and flows out of the mixing vessel in an axial direction. However, only dry saturated steam is detached from the vortex field, because at these high speeds of revolution and the resulting high centrifugal force at the inner periphery of the vortex it is impossible for water droplets to be carried along. In this steam generator the process of heat exchange and separation are coupled in time and in space so that the steam generator according to the invention will take up little space. In addition, almost the whole surface of the mixing container can be utilized for the injection of steam. For separating the steam from the liquid only the center of the liquid vortex in the mixing vessel is employed.

Details of the invention are described on the basis of the accompanying drawings in which:

FIG. 1 is a vertical sectional view of a steam generator embodying the invention;

FIG. 2 is a vertical sectional view of another form of the steam generator embodying the invention;

FIG. 3 is a vertical sectional view of another embodiment of a steam generator embodying the invention showing the mixing tube having a conical profile; and FIG. 4 is a vertical sectional view of another form of the steam generator embodying the invention showing more than one mixing tube.

FIG. 1 shows the steam generator essentially consisting of a vertically standing cylindrical vessel 1 with steam and condensate inlet lines 2 and 3 tangentially opening into it and a saturated steam line 4 leading axially upwards. In order to achieve as uniform a steam supply to the condensate in vessel 1 as possible, the steam inlet pipe does not directly open into the vessel 1 but into the worm-gear housing 5 surrounding the vessel 1 at a decreasing distance. In the region surrounded by the worm-gear housing 5 the vessel 1 is provided with uniformly distributed steam inlet openings 6 preferably opening into the vessel 1 tangentially, these openings being distributed over the area of the mixing vessel which is wetted by the condensate so as to effect a uniform quantity of steam inlet per unit area. The parabolic line 7 shown in FIG. 1 shows the contour of the liquid vortex during operation of the steam generator. Correspondingly, the steam inlet openings in the upper section of the mixing vessel are slightly smaller than those in the lower section because in the upper section the pressure of the layer of liquid on the outside wall is lower. Of course, it is sufficient for the formation of a vortex to introduce either the steam or the condensate tangentially into the vessel. Although a tangential inlet system 3 has been provided for the condensate, the condensate may be introduced into the mixing vessel 1 also coaxially from the bottom.

To maintain the working order of the steam generator there must always be a minimum amount of water in the mixing vessel. In most cases it is an advantage to have a certain quantity of water available in addition for reserve to offset fluctuations in the condensate supply. However, the different condensate quantities in the steam generator should not change the exchange path.

In a continued development of the invention according to FIG. 2 this is facilitated by arranging a condensate reception vessel 19 around the mixing vessel 11 proper. In the mixing vessel 11 the liquid which is to be evaporated is again forced into a rotary motion by feeding the steam via the worm-gear housing 15 through steam inlet openings 16 tangentially opening into the mixing vessel and by introducing the condensate into the mixing vessel through condensate inlet openings also preferably in a tangential direction. The mixing vessel 11 is open at the top and at the bottom—at the top for the generated saturated steam to be discharged into the vessel 19 which it leaves through the steam outlet line 14, at the bottom the mixing vessel 11 has an opening to establish circulation of the liquid in connection with the outlet openings 17 through the worm-gear housing between mixing vessel 11 and the intake vessel 19 and to keep the condensate uniformly at boiling temperature. In this connection it is favorable to arrange the outlet openings 17 on the wall of the mixing vessel so that the liquid already separated from the steam-liquid mixture can flow into the reception vessel 19. In addition, this arrangement has the advantage of making the rotating layer indicated by line 18 during operation of the steam generator practically always of a uniform thickness, independently of the amount of condensate fed in through line 13 so that the hot steam introduced through line 12 always has to traverse a layer of condensate of a predetermined and uniform thickness.

The possibilities of executing the invention are not restricted to the examples described herein.

It may be useful, for instance, to arrange several of the mixing vessels described in one common condensate reception vessel. Moreover, it may be an advantage to give the mixing vessel a certain profile, e.g. a conical profile, to attain certain speed and pressure conditions in the vortex.

I claim:

1. Steam generator comprising a vertically arranged condensate reception vessel at least partially filled with the liquid to be evaporated, at least one open ended mixing tube coaxially arranged in said condensate reception vessel, the upper end of said mixing tube extending above the liquid level in said condensate reception vessel, housing means surrounding at least the lowermost portion of said mixing tube and being spaced therefrom, inlet means for introducing steam from a source external to said condensate reception vessel into said housing means, a plurality of steam inlets uniformly distributed along the lowermost portion of said mixing tube opening tangentially into said mixing tube for admitting steam into said mixing tube, condensate inlet means provided in the lowermost portion of said condensation reception vessel for introducing condensate into the lowermost portion of said mixing tube, whereby on feeding the steam through said steam inlet openings the liquid contained in said mixing tube is forced into rotary motion, liquid outlet openings arranged above said steam inlet openings on said mixing tube through which liquid separated from the liquid-steam mixture in said mixing tube by said rotary motion flows into the condensate reception vessel and outlet means arranged at the upper end of said condensate reception vessel for discharging steam separated in said mixing tube by said rotary motion.

2. Steam generator according to claim 1 wherein said condensate inlets open tangentially into said mixing tube.

3. Steam generator according to claim 1 wherein said steam inlets are distributed over the circumference of said mixing vessel so as to provide a uniform steam inlet quantity per unit area.

4. Steam generator according to claim 1 wherein said mixing tube has a conical profile.

5. Steam generator according to claim 1 wherein more than one mixing tube is arranged in said condensate reception vessel.

References Cited

UNITED STATES PATENTS

| 1,867,143 | 7/1932 | Fohl. | |
| 2,669,440 | 2/1954 | Lindenbergh | 261—124 |
| 2,820,620 | 1/1958 | Anderson | 122—31 X |
| 2,822,157 | 2/1958 | Porter | 122—31 X |

CHARLES J. MYHRE, *Primary Examiner.*